US010619016B2

(12) United States Patent
Bayer et al.

(10) Patent No.: US 10,619,016 B2
(45) Date of Patent: Apr. 14, 2020

(54) FLAME-RETARDANT POLYAMIDE 12 MOULDING COMPOSITION FOR RAILWAY APPLICATIONS

(71) Applicant: EMS-PATENT AG, Domat/Ems (CH)

(72) Inventors: Andreas Bayer, Domat/Ems (CH); Georg Stoppelmann, Bonaduz (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 15/223,224

(22) Filed: Jul. 29, 2016

(65) Prior Publication Data
US 2017/0037198 A1 Feb. 9, 2017

(30) Foreign Application Priority Data
Aug. 6, 2015 (EP) .................................... 15180004

(51) Int. Cl.
| | | |
|---|---|---|
| *C08J 5/00* | (2006.01) | |
| *B29C 48/00* | (2019.01) | |
| *C08L 77/02* | (2006.01) | |
| *C08G 69/04* | (2006.01) | |
| *C08K 5/5313* | (2006.01) | |
| *B29C 45/00* | (2006.01) | |
| *B29C 49/00* | (2006.01) | |
| *B29C 49/04* | (2006.01) | |
| *B29K 77/00* | (2006.01) | |
| *B29K 105/00* | (2006.01) | |
| *B29L 31/30* | (2006.01) | |

(52) U.S. Cl.
CPC ............ *C08J 5/00* (2013.01); *B29C 45/0001* (2013.01); *B29C 48/022* (2019.02); *B29C 49/0005* (2013.01); *B29C 49/04* (2013.01); *C08G 69/04* (2013.01); *C08K 5/5313* (2013.01); *C08L 77/02* (2013.01); *B29K 2077/00* (2013.01); *B29K 2105/0026* (2013.01); *B29K 2995/0016* (2013.01); *B29L 2031/30* (2013.01); *C08J 2333/10* (2013.01); *C08J 2351/06* (2013.01); *C08J 2377/02* (2013.01); *C08L 2201/02* (2013.01); *C08L 2205/025* (2013.01); *C08L 2205/035* (2013.01)

(58) Field of Classification Search
CPC .............................. C08L 77/02; C08K 5/5313
See application file for complete search history.

(56) References Cited

U.S. PATENT DOCUMENTS

| | | | | |
|---|---|---|---|---|
| 5,773,556 A | * | 6/1998 | Kleiner | ................ C08K 5/5313 |
| | | | | 524/126 |
| 6,294,644 B1 | * | 9/2001 | Isobe | ..................... C08G 69/14 |
| | | | | 524/600 |
| 2011/0190428 A1 | * | 8/2011 | Kniesel | .................... C08J 3/226 |
| | | | | 524/101 |

FOREIGN PATENT DOCUMENTS

| | | |
|---|---|---|
| DE | 10 2005 041 966 A1 | 3/2007 |
| EP | 1 498 448 A1 | 1/2005 |
| EP | 1 670 862 A1 | 6/2006 |
| EP | 1 762 592 A1 | 3/2007 |
| EP | 2 410 020 A1 | 1/2012 |
| JP | 63089568 A * | 4/1988 |
| WO | 02/28953 A1 | 4/2002 |
| WO | 2005/035664 A1 | 4/2005 |
| WO | 2010/061128 A1 | 6/2010 |

OTHER PUBLICATIONS

Machine translated English language equivalent of JP 63-089568 (Apr. 1988, 2 pages).*
Ullmann's Encyclopedia of Industrial Chemistry, ed. Barbara Elvers, vol. A21, chapter 'Polyamides' (p. 179-205), VCH, Weinheim—Basel—Cambridge—New York, 1992.*
Human translation of JP 63-089568 (2018, 11 pages).*
European Search Report for 15180004.2 dated Oct. 26, 2015.

* cited by examiner

*Primary Examiner* — Brieann R Johnston
(74) *Attorney, Agent, or Firm* — Sughrue Mion, PLLC

(57) ABSTRACT

Polyamide moulding composition in particular for railway applications consisting of:
(A) from 50 to 90% by weight of a polyamide matrix consisting of (A1) polyamide 12 and optionally (A2) up to 85% by weight of polyamide elastomer based on polyamide 12;
(B) from 7 to 28% by weight of flame retardant consisting of (B1) at least one metal phosphinate, and also optionally (B2) up to 40% of a nitrogen-containing synergist and/or at least one nitrogen- and phosphorus-containing flame retardant;
(C) from 3 to 15% by weight of plasticizer;
(D) from 0 to 15% by weight polyolefin;
(E) from 0 to 10% by weight of additives and/or particulate fillers, with exclusion of fibrous reinforcing materials;
where the entirety of (C) and (D) is from 3 to 20% by weight, based on the entire moulding composition, and where the entirety of (A) to (E) provides 100% by weight.

30 Claims, No Drawings

FLAME-RETARDANT POLYAMIDE 12 MOULDING COMPOSITION FOR RAILWAY APPLICATIONS

TECHNICAL FIELD

The present invention relates to unreinforced flame-retardant polyamide 12 moulding compositions with plasticizer for railway applications, in particular based on mixtures of PA 12 and PA 12-based elastomers. The invention further relates to production processes for these polyamide moulding compositions and to uses thereof.

PRIOR ART

Flame-retardant polyamide moulding compositions are known per se from the prior art: by way of example, DE-A-10 2005 041 966 discloses a halogen-free flame-retardant polyamide moulding composition which is based on polyamide 66 and which is intended to have high flame resistance and high glow-wire resistance. However, these are fibre-reinforced polyamide moulding compositions rather than polyamide moulding compositions for the production of flexible components.

EP-A-1 670 862 likewise discloses a flame-retardant polyamide moulding composition which is composed not only of aliphatic polyamide but also to some extent of semi-aromatic polyamides, and which is intended for the production of mouldings, in particular of components for the electrical and electronics industry. Here again, fibre reinforcement systems are essential: this is not a polyamide moulding composition for the production of flexible components; and the aliphatic polyamide basis is polyamide 6 or polyamide 66.

WO-A-02/28953 discloses a halogen-free flame retardant formulation, and also polyamide moulding compositions equipped therewith; again, these moulding compositions are intended for the production of rigid moldings, in particular of components for the electrical and electronics industry. Accordingly, all of the moulding compositions used have glass fibre reinforcement, and great emphasis is placed on achievement of high rigidity. All of the moulding compositions used are based on polyamide 6.

WO-A-2010/061128 discloses halogen-free flame-retardant polyamide moulding compositions based on polyamide 66, polyamide 6 or polyamide 6/66 which have admixed functionalized polyolefin and which can comprise, or can omit, fibre reinforcement. However, a specific combination of two different polyolefins is used, the quantity of flame retardant required is high, and the examples are again intended for the production of rigid moldings.

EP-A-2 410 020 discloses unreinforced, halogen-free flame-retardant polyamide moulding compositions and uses of these for the production of electrical and/or electronic components, where particular value is placed on suitability for soldering processes. The polyamide basis used in that document is exclusively semi-aromatic polyamides based on terephthalic acid.

DESCRIPTION OF THE INVENTION

It is therefore inter alia an object of the present invention to provide a novel, in particular unreinforced polyamide moulding composition which has high flexibility, comprises a halogen-free flame retardant system, and in particular can be processed by extrusion processes or extrusion blow moulding processes.

This object is achieved via the moulding composition defined in the claims, the production process defined in the claims for the moulding composition, and the components made of this moulding composition, and also the uses of the moulding composition as stated in the claims.

The invention therefore proposes an unreinforced, flame-retardant polyamide moulding composition based on polyamide PA12 and optionally on polyamide elastomers which are likewise based on polyamide PA12 (hard segments).

A moulding composition in particular for railway applications is thus provided, e.g. in accordance with EN 45545. That standard contains strict requirements especially relating to LOI and low smoke values.

PA12 is widely used for railway applications because it has good mechanical properties and low smoke values. Compounded materials made of PA12/melamine cyanurate are prior art. However, these are subject to limitations for the following reasons:

high-viscosity PA12 leads to foaming due to decomposition of the flame retardant;
nitrogen-containing flame retardant can potentially increase HCN values and NO values;
melamine cyanurate does not provide adequate flame retardancy in combination with additives required for flexible moulding compositions.

According to the invention, therefore, a phosphorus-containing flame retardant is used. One of the products that can be used, namely Exolit OP1230, is primarily intended as flame retardant only for fibre-reinforced products and preferably for semi-aromatic polymers (e.g. PA, PES). In most Patent documents reinforcement fibres are described as essential or, if the claim does not contain precise requirements, all of the Examples use GF and quantities of flame retardant which do not exhibit adequate effect in unreinforced moulding compositions.

Surprisingly, it has been found that halogen-free flame retardants based on metal phosphinates can also be used advantageously for unreinforced, flexible PA12 moulding compositions (comprising plasticizer and optionally impact modifier or a PA elastomer). In particular in the case of flexibilized PA12 it is possible to achieve particularly good results in overcoming the disadvantages of use of melamine cyanurate as flame retardant.

Features of the moulding compositions proposed are in particular LOI>28% (preferably>30, with particular preference>32), modulus of elasticity<1000 MPa (meaning that a degree of flexibility must be present), tensile strain at break>100% and adequate notched impact resistance that is preferably≥10 kJ/m$^2$ (with particular preference≥15 kJ/m$^2$).

The present invention specifically provides a polyamide moulding composition consisting of:
(A) from 50 to 90% by weight of polyamide matrix consisting of:
  (A1) from 15 to 100% by weight of polyamide 12;
  (A2) from 0 to 85% by weight of polyamide elastomer based on polyamide 12;
  where the entirety of (A1) and (A2) provides 100% by weight of component (A);
(B) from 7 to 28% by weight of flame retardant consisting of:
  (B1) from 60 to 100% by weight of at least one metal phosphinate;
  (B2) from 0 to 40% by weight of at least one nitrogen-containing synergist and/or at least one nitrogen- and phosphorus-containing flame retardant;
  where the entirety of (B1) and (B2) provides 100% by weight of component (B);

(C) from 3 to 15% by weight of plasticizer;
(D) from 0 to 15% by weight polyolefin;
(E) from 0 to 10% by weight of additives and/or particulate fillers.

The entirety of (C) and (D) here is from 3 to 20% by weight, based on the entire moulding composition, and the entirety of (A) to (E) provides 100% by weight. In other words, the formulation stated above is to be understood as complete, and there is no scope for other constituents in the polyamide moulding composition alongside components (A) to (E) mentioned.

According to the invention, the polyamide moulding composition is always free from reinforcing fibres.

It is moreover preferable that there is no content of aromatic and/or semi-aromatic polyamide within the polyamide moulding composition.

As far as the quantitative data are concerned, it should be emphasized that the quantitative data for the subcomponents (A1) to (A2) and (B1) to (B2) are not based on the entire polyamide moulding composition; instead, the quantitative data stated in those respects are in each case based on 100% of the respective component; this means that the sum of the quantitative data for (A1) and (A2) is 100% of (A), and that the entirety of components (B1) to (B2) provides 100% of (B).

In so far as preferred quantities are stated hereinafter for components, the narrower ranges stated are in each case to be understood as meaning that the entirety of components (A) to (E) contributes no more than 100% by weight, that the entirety of components (A1) and (A2) contributes no more than 100% by weight of component (A), and that the entirety of components (B1) to (B2) contributes no more than 100% by weight of component (B), in each case based on the polyamide moulding composition.

Component (A): The polyamide matrix of component (A) consists either of polyamide 12 alone (only A1) or of a mixture of polyamide 12 (A1) with a polyamide elastomer (A2) based on polyamide 12, where in that case the content of component (A2) contributes no more than 85% by weight, based on the entirety of component (A).

According to a preferred embodiment, the polyamide matrix (A) consists of: (A1) from 20 to 100% by weight of polyamide 12 and (A2) from 0 to 80% by weight of polyamide elastomer based on polyamide 12.

According to another preferred embodiment, the polyamide matrix (A) consists of: (A1) from 50 to 100% by weight of polyamide 12 and (A2) from 0 to 50% by weight of polyamide elastomer based on polyamide 12.

According to a particularly preferred embodiment, the polyamide matrix (A) consists of: (A1) from 80 to 95% by weight of polyamide 12 and (A2) from 5 to 20% by weight of polyamide elastomer based on polyamide 12.

It is preferable that the content of component (A2) is in the range from 8 to 12% by weight of polyamide elastomer based on polyamide 12.

The entirety of (A1) and (A2) here always provides 100% by weight of component (A).

Component (A1) is preferably a polyamide 12 with solution viscosity determined in accordance with DIN EN ISO 307 $\eta_{rel}$=from 1.5 to 2.8, preferably $\eta_{rel}$=from 1.5 to 2.3 (measured in each case at 20° C. on a solution of 0.5 g of polymer in 100 ml of m-kresol). Types of polyamide 12 used as component (A1) are preferably those with average solution viscosity $\eta_{rel}$=from 1.8 to 2.1, or in particular $\eta_{rel}$=from 1.9 to 2.0, because these types have processability advantages. It is also advantageous to use mixtures of PA12 types with different solution viscosity, where solution viscosities of all of the mixture constituents are however then within the stated ranges.

The melt viscosity (MVR, melt volume-flow rate) of the moulding compositions of the invention is advantageously in the range from 3 to 120 cm³/10 min, in particular in the range from 5 to 100 cm³/10 min, very particularly preferably in the range from 10 to 60 cm³/10 min, determined in accordance with ISO 1133 at 275° C. with an applied weight of 5 kg.

The melting point of the polyamide 12 is typically in the range from 175 to 185° C.

Polyamide-elastomer Component (A2) is preferably a polyamide elastomer composed of hard segments based on polyamide 12 (preferably exclusively of such hard segments) and of soft segments based, preferably exclusively, on polyetherdiol, dimer diol (based on dimerized fatty acids having from 20 to 44 C atoms) and/or polyetherdiamine.

This polyetherdiol of the soft segment is preferably based, preferably exclusively, on at least one C2-C5 (preferably C2-C4) polyoxyalkylene unit, particularly preferably selected from the following group: ethylene oxide, propylene oxide, tetrahydrofuran and mixtures thereof.

The dimer diols of the invention having from 20 to 44 C atoms, preferably having from 24 to 36 C atoms, are preferably aliphatic or cycloaliphatic diols produced by dimerization of unsaturated fatty acids and subsequent hydrogenation. Particular preference is given to C36 dimer diol (CAS No. 147853-32-5) and C44 dimer diol.

Alternatively or in addition, the polyetherdiamine soft segment can preferably be based, preferably exclusively, on at least one C2-C5 (preferably C2-C4) polyoxyalkylene unit, particularly preferably selected from the following group: ethylene oxide, propylene oxide, tetrahydrofuran and mixtures thereof.

According to a preferred embodiment, the number-average molar mass of the rigid polyamide 12 segments is in the range from 500 to 10 000 g/mol, preferably from 700 to 5000 g/mol and particularly preferably from 750 to 3000 g/mol.

On the other hand, it is preferable that the number-average molar mass of the soft segments is from 200 to 4000 g/mol, preferably in the range from 200 to 3000 g/mol, particularly preferably from 300 to 2500 g/mol.

According to a preferred embodiment, the content of rigid polyamide 12 segment is in the range from 45 to 95% by weight, preferably from 50 to 80% by weight, and the content of soft segments is in the range from 5 to 55% by weight, preferably from 20 to 50% by weight, based in each case on 100% of component (A2).

A particularly preferred embodiment of component (A2) is characterized in that it is free from ester bonds.

According to another embodiment, the polyamide elastomer at least has an amorphous phase preferably deriving from the soft-segment unit, which is the ether fraction. According to a preferred embodiment, the glass transition temperature of this amorphous phase is at most 20° C. It is preferable that the glass transition temperature of this amorphous phase of the polyetheramides is below 0° C., preferably below –20° C. It is preferable that the glass transition temperature of the soft segment is in the range from –70° C. to 0° C., in particular in the range from –60° C. to –20° C., determined in each case by means of DSC in accordance with ISO 11357-2.

The polyamide elastomers are preferably produced in a single- or two-stage polycondensation process. In the single-stage process, the polyamide-forming components are mixed together with the dimer diol and/or polyether component, the ratio of the terminal groups of the individual mixture components being as close to equimolar as possible, and are polycondensed at temperatures in the range from 180 to 300° C. until the desired viscosity has been reached. If a specific block structure is desired, it is advantageous to use the two-stage process. In a first stage of this, the polyamide units provided with carboxy or amino terminal groups are first formed at temperatures of from 180 to 320° C. and at pressures of from 0 to 20 bar, and these are then polycondensed with the soft-segment units at atmospheric pressure or reduced pressure (vacuum) at temperatures in the range from 180 to 280° C. to give the high-molecular-weight copolymer. If soft-segment units having hydroxy terminal groups are used, it is advantageous to use esterification catalysts, e.g. organic titanates or zirconates, to accelerate the reaction.

The tensile modulus of elasticity of the polyamide elastomers of the invention is preferably at most 1200 MPa, preferably at most 1000 MPa and particularly preferably at most 700 MPa. It is therefore preferable that the stiffness values of the polyamide elastomers are in the range of tensile modulus of elasticity from 50 to 1000 MPa, and particularly from 80 to 700 MPa.

Component (B): The content of flame retardant component (B) present in the polyamide moulding composition is from 7 to 28% by weight. This can be exclusively a flame retardant consisting of metal phosphinate (B1) (or a mixture of such systems), but there can also be admixture of up to 40% by weight of (B2) at least one nitrogen-containing synergist and/or at least one nitrogen- and phosphorus-containing flame retardant. The percentage data are based in each case on 100% by weight of component (B), meaning that the entirety of (B1) to (B2) always provides 100% by weight of component (B).

According to a preferred embodiment, the polyamide moulding composition is characterized in that the content of component (B) within the moulding composition is in the range from 10 to 25% by weight, preferably in the range from 10 to 17% by weight.

In respect of the composition of component (B) it is moreover preferable that component (B) is composed of from 70 to 100% by weight of (B1), from 0 to 30% by weight of (B2), preferably from 80 to 100% by weight of (B1), from 0 to 20% by weight of (B2), particularly preferably from 79.5 to 95.5% by weight of (B1), from 4.5 to 20.5% by weight of (B2), where the entirety of (B1) and (B2) in each case provides 100% by weight of component (B). In another preferred embodiment, component (B) consists exclusively of component (B1), and the moulding composition therefore comprises no component (B2).

It is preferable that the at least one metal phosphinate of component (B1) is selected as phosphinic salt and/or diphosphinic salt, preferably a phosphonic salt of the general formula (I) and/or formula (II) and/or polymers thereof

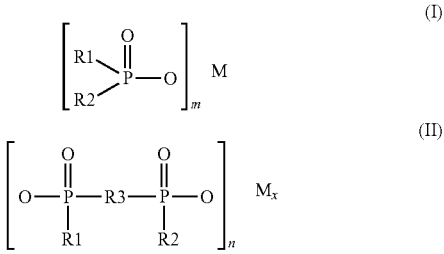

in which
R1, R2 are identical or different and preferably C1-C8-alkyl, linear or branched and/or aryl;
R3 are C1-C10-alkylene, linear or branched, C6-C10-arylene, -alkylarylene or arylalkylene;
M is a metal ion from the 2nd or 3rd main or transition group of the periodic table of the elements; and
m is 2 or 3;
n is 1 or 3;
x is 1 or 2.

It is preferable to use Al, Ca and Zn as metal ion M.

It is preferable that component (B2) is melamine or condensates of melamine, e.g. melem, melam, melon, or reaction products of melamine with polyphosphoric acid, or reaction products of condensates of melamine with polyphosphoric acid, or is a mixture thereof.

Melamine polyphosphate is in particular preferred as component (B2). Flame retardants of this type are known from the prior art. In this connection reference is made to DE 103 46 3261, and in this connection the disclosure of that document is expressly incorporated herein.

In respect of flame retardants, it is particularly preferable that (B2), and therefore the entire polyamide moulding composition, comprises no melamine cyanurate (B2).

Component (C): There is from 3 to 15% by weight of plasticizer content in the polyamide moulding composition. The plasticizer differs here from the other components of the polyamide moulding composition, and in particular the plasticizer is not a system of the type of (A2), (B), (D) and/or (E). Component (C) is therefore expressly different from component (A2), (B), (D) and/or (E). According to a preferred embodiment of the moulding composition, the content of the plasticizer of component (C) in the moulding composition is in the range from 5 to 12% by weight, preferably in the range from 5 to 10% by weight.

It is preferable that the plasticizer of component (C) is based on an amide of arylsulfonic acids having from 2 to 12 C atoms, on esters of p-hydroxybenzoic acid having from 2 to 20 C atoms in the alcohol component, or on phosphonates or phosphates; it is preferable that the plasticizer consists of an arylsulfonamide, i.e. that there are only arylsulfonamide systems as plasticizers within component (C).

Preferred phosphorus-containing plasticizers are inter alia diphenyl cresyl phosphate, tris(2-ethylhexyl) phosphate, diphenyl 2-ethylhexyl phosphate, tricresyl phosphate, alkyl and aryl phosphonates, diethyl phosphonate and cyclic phosphonates, e.g. Aflammit PLF 710.

Preferred esters of 4-hydroxybenzoic acid are octyl p-hydroxybenzoate, ethyl p-hydroxybenzoate, isohexadecyl p-hydroxybenzoate, 2-hexyldecyl p-hydroxybenzoate.

Preferred representatives of the arylsulfonamides are benzenesulfonamide, N-alkylbenzenesulfonamides where the alkyl moieties bear a total of from 1 to 20 C atoms, preferably N-butylbenzenesulfonamide, N-octylbenzenesulfonamide, N-ethylhexylbenzenesulfonamide, N-cyclohexylbenzenesulfonamide, toluenesulfonamide, N-alkyltoluenesulfonamides where the alkyl groups comprise from 1 to 20 C atoms, preferably N-ethyltoluenesulfonamide and N-butyltoluenesulfonamide.

It is preferable that component (C) comprises at least one of the following plasticizers, and it is preferable that the component consists of at least one of the following plasticizers: octyl p-hydroxybenzoate, ethyl p-hydroxybenzoate, isohexadecyl p-hydroxybenzoate, 2-hexyldecyl p-hydroxybenzoate, benzenesulfonamide, N-alkylbenzenesulfonamides where the alkyl moieties bear a total of from 1 to 20 C atoms, preferably N-butylbenzenesulfonamide, N-octylbenzenesulfonamide, N-ethylhexylbenzenesulfonamide, N-(2-hydroxypropyl)benzene sulfonamide, N-cyclohexylbenzene sulfonamide, o-toluenesulfonamide, p-toluenesulfonamide, N-alkyl-o- or -p-toluenesulfonamides where the alkyl groups bear from 1 to 20 C atoms, preferably N-ethyl-o-toluenesulfonamide, N-ethyl-p-toluenesulfonamide, N-butyl-o-toluenesulfonamide and N-butyl-p-toluenesulfonamide. The systems mentioned can be used individually or in mixtures. Particular preference is given to a mixture of N-alkylbenzenesulfonamide and p-toluenesulfonamide.

It is very particularly preferable to use exclusively N-butylbenzenesulfonamide as component (C).

Component (D): There can optionally be up to 15% by weight of polyolefin content in the polyamide moulding composition. The content of component (D) in the moulding composition is preferably in the range from 0 to 12% by weight, preferably in the range from 4 to 10% by weight.

In a preferred embodiment, this polyolefin of component (D) is based on at least one of, or a combination of, the following units, preferably as copolymer, particularly preferably as terpolymer: ethylene, propylene, butylene, acrylate, methacrylate, acrylic acid, methacrylic acid, maleic anhydride, glycidyl methacrylate, diene, in particular butadiene and/or isoprene. It particularly preferably takes the form of ethylene-propylene and ethylene-butylene copolymer, grafted with maleic anhydride, and/or takes the form of ethylene-methacrylic acid-acrylate terpolymer neutralized with metal ions, particularly preferably with zinc ions.

According to another preferred embodiment, the at least one polyolefin of component (D) is selected from the following group: ethylene-propylene rubber (EPM, EPR), ethylene-propylene-diene rubber (EPDM), styrene-containing elastomer, in particular SEBS, SBS, SEPS, acrylate rubber, nitrile rubbers (NBR, HNBR), silicone rubber.

According to another preferred embodiment in respect of component (D), the at least one polyolefin has been functionalized, preferably with maleic anhydride and/or glycidyl methacrylate. The degree of grafting here is preferably in the range from 0.05 to 10%.

Component (D) can moreover be a polyolefin ionomer, preferably based on an ethylene/methacrylic acid copolymer entirely or to some extent neutralized with zinc ions.

Component (E): As described above, the polyamide moulding composition can, for the purposes of component (E), comprise up to 10% by weight of additives, particulate fillers, or both. Here again, it should be emphasized that the additives of component (E) differ from the other components (A) to (D).

The content of component (E) in the moulding composition is preferably in the range from 0 to 8% by weight, particularly preferably in the range from 1 to 5% by weight.

In respect of component (E), particular preference is given to the situation in which there are no particulate fillers, i.e. to the situation in which the polyamide moulding composition is free from particulate fillers.

It is preferable that the additives are stabilizers such as UV stabilizers, heat stabilizers, free-radical scavengers and/or processing aids, oxygen-, nitrogen- or sulphur-containing metal compounds, other polymers and/or functional additives preferably for influencing optical properties such as in particular refractive index, or combinations or mixtures thereof. The moulding compositions can moreover include particulate fillers, for example nanoscale fillers and/or nanoscale functional materials, for example laminar minerals or metal oxides which increase refractive index, or photochromic dyes. It is equally possible to use glass beads, carbon black, graphite, mineral, for example calcium carbonate or barium sulfate, or other polymers.

Preferred oxygen-, nitrogen- or sulphur-containing metal compounds within component (E) are based mainly on the metals aluminium, calcium, magnesium and zinc. Suitable compounds are selected from the group of oxides, hydroxides, carbonates, silicates, borates, phosphates, stannates, and also combinations and mixtures of these compounds, e.g. oxide hydroxides or oxide hydroxide carbonates. Examples are magnesium oxide, calcium oxide, aluminium oxide, zinc oxide, magnesium hydroxide, aluminium hydroxide, boehmite, dihydrotalcite, hydrocalumite, calcium hydroxide, tin oxide hydrate, zinc hydroxide, zinc borate, zinc sulfide, zinc phosphate, calcium carbonate, calcium phosphate, magnesium carbonate, basic zinc silicate, zinc stannate, barium stearate, calcium stearate, zinc stearate, magnesium stearate, potassium palmitate, magnesium behenate.

A particularly preferred embodiment of the polyamide moulding composition proposed is characterized in that its composition is as follows:

(A) from 60 to 79% by weight of a polyamide matrix consisting:
  (A1) from 80 to 92% by weight of polyamide 12;
  (A2) from 8 to 20% by weight of polyamide elastomer made of rigid polyamide 12 segments and of soft segments based, preferably exclusively, on polyetherdiol made of at least one unit selected from the following group: ethylene oxide, propylene oxide, tetrahydrofuran; where the polyamide elastomer is preferably free from ester bonds;
  where the entirety of (A1) and (A2) provides 100% by weight of component (A);
(B) from 8 to 25% by weight of flame retardant consisting of at least one metal phosphinate selected as phosphinic salt and/or diphosphinic salt;
(C) from 5 to 10% by weight of plasticizer selected as N-butylbenzenesulfonamide;
(D) from 8 to 12% by weight of polyolefin selected as copolymer composed of at least one of, or a combination of, the following units: ethylene, propylene, butylene, acrylate, methacrylate, acrylic acid, methacrylic acid preferably functionalized with maleic anhydride and/or as polyolefin ionomer;
(E) from 0 to 5% by weight of additives with exclusion of particulate fillers;
where the entirety of (C) and (D) is from 13 to 20% by weight, based on the entire moulding composition, and where the entirety of (A) to (E) provides 100% by weight.

The present invention moreover provides a process for the production of the polyamide moulding composition described above, which process is preferably characterized in that components (A) are premixed separately from components (B) and are metered separately into the intake of a compounder. Alternatively, it is also possible to meter (B) by way of a sidefeeder into the melt of (A). Component (C) is, if necessary, likewise separately premixed and pumped in liquid form into the melt of the other components. Components (D) and (E) can be admixed as desired with (A) or (B), preference being given here to (A). It is preferable that the melt is devolatilized under atmospheric pressure or vacuum in order to obtain granulate that is more compact.

The present invention further provides a granulate or powder, or components, made of the polyamide moulding composition described above.

The present invention in particular provides flexible components, in particular for fire-protected applications in the railway sector, preferably as coating, covering, film, profile, corrugated or non-corrugated pipe, hollow body, gasket, cladding, holder, housing, sheathing, or electrical or electronic component, preferably plugged or fan, preferably approved in accordance with DIN EN 45545.

It is preferable that the modulus of elasticity of the components is smaller than 1000 MPa, and/or that their tensile strain at break is greater than 100%, and/or that their notched impact resistance is greater than or equal to 10 kJ/m$^2$, in particular greater than or equal to 15 kJ/m$^2$ or greater than or equal to 20 kJ/m$^2$.

The present invention moreover provides a process for the production of the said article. The process is preferably characterized in that the polyamide moulding composition described above is moulded in an extrusion process or extrusion blow moulding process, an injection-moulding process or an in-mould-coating process to give the article.

Finally, the present invention provides the use of the polyamide moulding composition described above for the production of the said components.

The dependent claims provide further embodiments.

DESCRIPTION OF PREFERRED EMBODIMENTS

Preferred embodiments of the invention are described hereinafter with reference to the Inventive Examples, which are non-restrictive and serve merely for elucidation.

Production of the Polyamide Moulding Compositions:

Components of the type (A1), i.e. PA12 HV and/or PA 12 TV, were compounded optionally with components (A2), i.e. ELG 4960 and/or ELG 5930, component (B), i.e. OP1230, component (C), i.e. BBSA, component (D), i.e. Tafmer and/or Surlyn, and the additives of component (E) in the proportions stated in the Tables hereinafter, by the following process:

The raw materials of components (A), (D) and (E) are premixed and metered gravimetrically by way of a belt weigher into the intake of a ZSK25 twin-screw extruder from Werner and Pfleiderer. Component (B) is optionally likewise premixed and likewise metered gravimetrically into the intake by way of a screw-conveyor system. The plasticizer is metered into the mixture by way of a pump 5 zones before the die. Alternatively, the plasticizer can also be premixed with component A in an extruder. The volume throughput of the pump is measured in advance; high-viscosity plasticizers can be processed more easily by using a heatable pump at elevated temperature. The melt is devolatilized (open devolatilization zone) 2 zones before the die. Barrel temperatures of from 270 to 290° C. are used with screw rotation rate 200 rpm and throughput 15 kg/h. The compounded material is discharged by way of die, and granulated after cooling of the strand. This is followed by 24 h of vacuum-drying at 80° C.

Production of the Moldings:

The moldings are produced in an Arburg Allrounder 320-210-750 injection-moulding machine with rising cylinder temperature profile from 240 to 260° C. and injection pressures of from 1200 to 1800 bar. Mould temperature is 40° C. The geometry of the mouldings corresponds to the requirements of the corresponding test standards.

Tables 1 and 2 collate the compositions of the moulding compositions and the properties of the mouldings produced therefrom; Table 3 provides Comparative Examples.

TABLE 1

Inventive Examples IE1-IE6 according to the invention:

|  |  | IE1 | IE2 | IE3 | IE4 | IE5 | IE6 |
|---|---|---|---|---|---|---|---|
| PA12 HV | w % | 74.7 | 65.7 | 51.7 | 56.7 | 55.7 | 50.7 |
| PA12 LV | w % |  |  | 16 | 16 | 16 | 17 |
| BBSA | w % | 10 | 9 | 12 | 7 | 8 | 9 |
| Tafmer MC201 | w % |  |  |  |  |  | 6 |
| Surlyn 9320 | w % |  |  | 8 | 8 | 8 |  |
| OP1230 | w % | 15 | 25 | 12 | 12 | 10 | 17 |
| Stabilizer | w % | 0.3 | 0.3 | 0.3 | 0.3 | 0.3 | 0.3 |
| Properties |  |  |  |  |  |  |  |
| Modulus of elasticity | MPa | 700 | 800 | 420 | 600 | 600 | 640 |
| Tensile strain at break | % | 170 | 160 | 210 | 180 | 195 | 170 |
| Notched impact resistance at 23° C. | kJ/m$^2$ | 20 | 16 | 34 | 17 | 18 | 35 |
| LOI | % | 30 | 40 | 35 | 32 | 30 | 31 |
| Foaming |  | — | — | — | — | — | — |
| MVR (275° C./5 kg) | cm$^3$/10 min | 8 | 6 | 30 | 14 | 29 | 36 |

Legend:
w %: % by weight

TABLE 2

Inventive Examples IE7-IE12 according to the invention:

|  |  | B7 | B8 | B9 | B10 | B11 | B12 |
|---|---|---|---|---|---|---|---|
| PA12 HV | w % | 66.7 | 50.7 | 53.7 | 50.7 |  |  |
| PA12 LV | w % |  | 14 | 16 | 14 | 17 | 36.7 |
| ELG 4960 | w % |  | 10 |  | 10 |  |  |
| ELG 5930 | w % |  |  |  |  | 58 | 40 |
| BBSA | w % | 10 | 5 | 8 | 7 | 3 | 3 |
| Tafmer MC201 | w % | 4 |  |  |  |  |  |
| Surlyn 9320 | w % |  | 10 | 12 | 8 |  |  |
| OP1230 | w % | 19 | 10 | 8 | 10 | 25 | 20 |
| Stabilizer | w % | 0.3 | 0.3 | 0.3 | 0.3 | 0.3 | 0.3 |
| Properties |  |  |  |  |  |  |  |
| Modulus of elasticity | MPa | 630 | 550 | 440 | 450 | 750 | 940 |
| Tensile strain at break | % | 150 | 250 | 240 | 290 | 200 | 200 |
| Notched impact resistance at 23° C. | kJ/m$^2$ | 20 | 24 | 26 | 21 | 15 | 10 |
| LOI | % | 37 | 30 | 28 | 30 | 33 | 30 |
| Foaming |  | — | — | — | — | — | — |
| MVR (275° C./5 kg) | cm$^3$/10 min | 9 | 25 | 21 | 39 | 55 | 45 |

Legend:
w %: % by weight;
HV: high-viscosity;
LV: low-viscosity;
LOI: Limiting Oxygen Index

TABLE 3

Comparative Examples CE1-CE4:

|  |  | CE1 | CE2 | CE3 | CE4 |
|---|---|---|---|---|---|
| PA12 HV | w % |  |  | 67 |  |
| PA12 LV | w % | 84.7 | 39.7 | 12.5 | 17 |
| ELG 5930 | w % |  | 40 |  | 55 |
| BBSA | w % |  |  | 6 | 3 |
| MC | w % |  |  | 12.5 | 25 |
| OP1230 | w % | 15 | 20 |  |  |
| Stabilizer | w % | 0.3 | 0.3 | 0.3 | 0.3 |

TABLE 3-continued

Comparative Examples CE1-CE4:

|  |  | CE1 | CE2 | CE3 | CE4 |
|---|---|---|---|---|---|
| Properties | | | | | |
| Modulus of elasticity | MPa | 2120 | 1120 | 840 | 710 |
| Tensile strain at break | % | 50 | 200 | 210 | 190 |
| Notched impact resistance at 23° C. | kJ/m² | 5 | 7 | 9 | 7 |
| LOI | % | 30 | 30 | 24 | 27 |
| Foaming | | − | − | + | + |
| MVR (275° C./5 kg) | cm³/10 min | 160 | 20 | nm | nm |

Legend:
w %: % by weight;
HV: high-viscosity
LV: low-viscosity;
LOI: Limiting Oxygen Index;
nm: not measured

TABLE 4

Inventive Examples IE13 to IE17 according to the invention:

|  |  | B13 | B14 | B15 | B16 | B17 |
|---|---|---|---|---|---|---|
| PA12 HV | w % | 33.7 | 48.7 |  | 66.7 | 58.7 |
| PA12 MV |  |  |  | 68.2 |  |  |
| PA12 LV | w % | 31 | 16 |  |  | 16 |
| BBSA | w % | 6 |  | 8.5 | 10 |  |
| DPK | w % | 6 |  |  |  |  |
| HDPB | w % |  | 12 |  |  | 7 |
| Tafmer MC201 | w % | 8 | 8 | 6 | 4 |  |
| Surlyn 9320 | w % |  |  |  |  | 8 |
| OP1230 | w % | 12 | 12 | 17 | 16 | 10 |
| MPP | w % | 3 | 3 |  | 2 |  |
| Zinc borate | w % |  |  |  | 1 |  |
| Stabilizer | w % | 0.3 | 0.3 | 0.3 | 0.3 | 0.3 |
| Properties | | | | | | |
| Modulus of elasticity | MPa | 470 | 472 | 625 | 640 | 750 |
| Tensile strain at break | % | 168 | 234 | 200 | 150 | 242 |
| Notched impact resistance at 23° C. | kJ/m² | 33 | 19 | 17 | 64 | 10 |
| LOI | % | 29 | 31 | 32 | 31 | 31 |
| Foaming |  | — | — | — | — | — |
| MVR (275° C./10 min) | cm³/10 min | 28 | 115 | 56 | 14 | 29 |

Testing was carried out in accordance with the following standards and on the following test samples in the dry state. This means that after injection moulding the test samples are stored for at least 48 h at room temperature in a dry environment over silica gel before they are tested.

Thermal behaviour (melting point ($T_M$), enthalpy of fusion ($\Delta H_m$), glass transition temperature ($T_g$)) was determined on the granulate with reference to ISO 11357 (11357-2 for glass transition temperature, 11357-3 for melting point and enthalpy of fusion). Differential scanning calorimetry (DSC) was carried out with heating rate 20° C./min.

Relative viscosity ($\eta_{rel}$) was determined in accordance with DIN EN ISO 307 on solutions of 0.5 g of polymer in 100 ml of m-kresol at a temperature of 20° C. Granulate is used as sample.

Tensile modulus of elasticity, breaking strength and tensile strain at break: Tensile modulus of elasticity, breaking strength and tensile strain at break were determined in accordance with ISO 527 with a tensile testing velocity of 1 mm/min (tension modulus of elasticity) and, respectively, 50 mm/min (breaking strength, tensile strain at break) on an ISO tensile sample, standard ISO/CD 3167, type A1, 170× 20/10×4 mm at a temperature of 23° C.

Impact resistance and notched impact resistance by the Charpy method were measured in accordance with ISO 179/keU and, respectively, ISO 179/keA on an ISO test sample, standard ISO/CD 3167, type B1, 80×10×4 mm at a temperature of 23° C.

Oxygen index (LOI=Limiting Oxygen Index) is the minimal oxygen concentration of an oxygen-nitrogen mixture at which a vertically arranged test sample continues to burn under the test conditions. LOI is determined in accordance with ISO 4589.

Foaming: Assessed visually on granulate or extruded strands. To this end, the granulates or strands are cut with a sharp blade perpendicularly to the direction of extrusion, and the cut surface is examined using a lens or microscope. A granulate is assessed as foamed (indicated by + in Tables) if there are bubbles on at least 25% of the cut surface. If there are just a few cavities (vacuoles), or the cut surfaces are entirely compact, the Tables indicate not foamed (−).

MVR (Melt Volume flow Rate) is determined in accordance with ISO 1133 using a capillary rheometer, where the material (granulate) is melted in a heatable cylinder at a temperature of 275° C. and forced through a defined die (capillary) under a pressure resulting from the applied load of 5 kg. The volume of the polymer melt discharged is determined as a function of time.

The following materials were used:
PA12 HV: Polyamide PA12 with solution viscosity $\eta_{rel}$=2.2 (solution of 0.5 g of polymer in 100 ml of m-kresol, 20° C.) and melting point 178° C., EMS-CHEMIE AG.
PA12 MV: Polyamide PA12 with solution viscosity $\eta_{rel}$=2.0 and melting point 178° C., EMS-CHEMIE AG.
PA12 TV: Polyamide PA12 with solution viscosity $\eta_{rel}$=1.7 (solution of 0.5 g of polymer in 100 ml of m-kresol, 20° C.) and melting point 178° C., EMS-CHEMIE AG.
ELG 4960: Polyetheramide based on polyamide PA12 and on THF with solution viscosity $\eta_{rel}$=1.7 (0.5% by weight in m-kresol, 20° C.) and melting point 155° C., EMS-CHEMIE.
ELG 5930: Polyetheramide based on polyamide PA12 and on propylene oxide with solution viscosity $\eta_{rel}$=1.9 (0.5% by weight in m-kresol, 20° C.) and melting point 162° C., EMS-CHEMIE.
BBSA: N-butylbenzenesulfonamide.
Tafmer MC201: Impact modifier mixture made of maleic anhydride-grafted ethylene-propylene copolymers and maleic-anhydride-grafted ethylene-butylene copolymers, Mitsui.
Exolit OP1230: Organophosphorus salt (Clariant Produkte GmbH), flame retardant.
MC: Melamine cyanurate, Melapur MC25, BASF SE.
Surlyn 9320: Ethylene-methacrylic acid-acrylate terpolymer, to some extent neutralized with zinc ions (DuPont).
Stabilizer: Irganox 1098, sterically hindered phenolic antioxidant (BASF SE).
DPK: Disflamoll DPK (Lanxess AG), diphenyl cresyl phosphate plasticizer.
HDPB: 2-Hexyldecyl 4-hydroxybenzoate. CAS 148348-12-3.
MPP: Melamine polyphosphate, Melapur 200 70 (BASF SE).
Zinc borate: Firebreak 500 (U.S. Borax Inc.).

Results:

As shown in the respective penultimate row of the respective table, when the polyamide moulding compositions of the invention are processed they do not exhibit the foaming that occurs in Comparative Examples 3 and 4 using MC.

As shown in Comparative Examples 3 and 4, the LOI value achieved with MC is moreover inadequate when other additional substances of components (C) and (D) are used. Comparison with Comparative Examples 1 and 2 equipped with a halogen-free flame retardant but without plasticizer reveals that the modulus of elasticity of these systems is too high for the planned flexible applications, and that their notched impact resistance is too low.

The Inventive Examples in Table 4 show that even when the plasticizer and the impact modifier are varied, and also when component B2 is added, it is likewise possible to produce flexible moulding compositions with adequate impact resistance and LOI greater than 28.

The invention claimed is:

1. A polyamide moulding composition consisting of:
   (A) from 50 to 90% by weight of polyamide matrix consisting of:
      (A1) from 15 to 100% by weight of a mixture of polyamide 12 with high viscosity with solution viscosity in the range $\eta_{rel}$=from larger than 2.0 to 2.8, measured at 20° C. on a solution of 0.5 g of polymer in 100 ml of m-kresol, and polyamide 12 with low viscosity with solution viscosity in the range $\eta_{rel}$=from 1.5 to smaller than 1.9, measured at 20° C. on a solution of 0.5 g of polymer in 100 ml of m-kresol; and
      (A2) from 0 to 85% by weight of polyamide elastomer based on polyamide 12;
      where the entirety of (A1) and (A2) provides 100% by weight of component (A);
   (B) from 7 to 17% by weight of flame retardant consisting of:
      (B1) from 60 to 100% by weight of at least one metal phosphinate; and
      (B2) from 0 to 40% by weight of at least one nitrogen-containing synergist and/or at least one nitrogen- and phosphorus-containing flame retardant;
      where the entirety of (B1) and (B2) provides 100% by weight of component (B);
   (C) from 3 to 12% by weight of a plasticizer comprising N-butylbenzenesulfonamide;
   (D) from 8 to 12% by weight of a polyolefin ionomer consisting of (i) ethylene, propylene, and/or butylene, (ii) acrylic acid and/or methacrylic acid, and optionally (iii) acrylate and/or methacrylate; and
   (E) from 0.3 to 5% by weight of additives comprising at least one stabilizer;
   where component (E) is free from fibrous reinforcing materials and free from particulate fillers,
   where the entirety of (C) and (D) is from 3 to 20% by weight, based on the entire moulding composition, and
   where the entirety of (A) to (E) provides 100% by weight.

2. The polyamide moulding composition according to claim 1, wherein the polyamide matrix (A) consists of:
   (A1) from 20 to 100% by weight, of said polyamide 12 mixture;
   (A2) from 0 to 80% by weight, of said polyamide elastomer based on polyamide 12, where the entirety of (A1) and (A2) provides 100% by weight of component (A).

3. The polyamide moulding composition according to claim 1, wherein the polyamide elastomer of component (A2) has
   hard segments based on polyamide 12, and
   soft segments based on
      polyether diol based on at least one unit selected from the group consisting of: ethylene oxide, propylene oxide, tetrahydrofuran and mixtures thereof,
      and/or dimer diol,
      and/or polyetherdiamine, based on at least one unit selected from the group consisting of: ethylene oxide, propylene oxide, tetrahydrofuran and mixtures thereof.

4. The polyamide moulding composition according to claim 1, wherein component (B) is composed of from 70 to 100% by weight of (B1), from 0 to 30% by weight of (B2), where the entirety of (B1) and (B2) provides 100% by weight of component (B).

5. The polyamide moulding composition according to claim 1, wherein the at least one metal phosphinate of component (B1) is selected from the group consisting of: phosphinic salt and diphosphinic salt, of the general formula (I) and/or formula (II) and/or polymers thereof

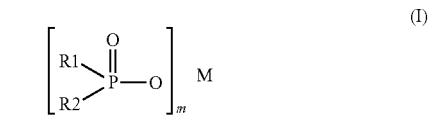

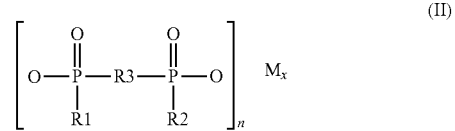

in which
R1, R2 are identical or different and including C1-C8-alkyl, linear or branched and/or aryl;
R3 are C1-C10-alkylene, linear or branched, C6-C10-arylene, -alkylarylene or arylalkylene;
M is a metal ion from the 2nd or 3rd main or transition group of the periodic table of the elements; and
m is 2 or 3;
n is 1 or 3;
x is 1 or 2.

6. The polyamide moulding composition according to claim 1, wherein the content of the plasticizer of component (C) in the moulding composition is in the range from 5 to 12% by weight.

7. The polyamide moulding composition according to claim 1,
   wherein it comprises no aromatic and/or semi-aromatic polyamide, and/or
   that it comprises no melamine polyphosphate and/or melamine cyanurate.

8. The polyamide moulding composition according to claim 1, wherein it consists of:
   (A) from 60 to 79% by weight of a polyamide matrix consisting:
      (A1) from 80 to 92% by weight of said polyamide 12 mixture;
      (A2) from 8 to 20% by weight of polyamide elastomer made of hard polyamide 12 segments and of soft segments based, on polyetherdiol made of at least one unit selected from the group consisting of: ethylene oxide, propylene oxide, and tetrahydrofuran;

where the entirety of (A1) and (A2) provides 100% by weight of component (A);
(B) from 8 to 25% by weight of flame retardant consisting of at least one metal phosphinate selected from the group consisting of: phosphinic salt and/or diphosphinic salt;
(C) from 5 to 10% by weight of said plasticizer;
(D) from 8 to 12% by weight of said polyolefin;
(E) from 0.3 to 5% by weight of said additives;
where the entirety of (C) and (D) is from 13 to 20% by weight, based on the entire moulding composition, and where the entirety of (A) to (E) provides 100% by weight.

9. A process for the production of a polyamide moulding composition according to claim 1, wherein components (A1) and if present (A2) are mixed and simultaneously or subsequently components (B) to (E) are incorporated, where the mixing takes place in the temperature range from 260 to 300° C., and the plasticizer (C) is introduced into the mixture either separately by way of a liquid metering system or after premixing with component (A) by way of a granulate metering system.

10. A component made of a polyamide moulding composition produced in a process according to claim 9, for fire-protected applications in the railway sector.

11. A process for the production of a component according to claim 10, where the polyamide moulding composition is produced in an extrusion process or extrusion blow moulding process, an injection-moulding process or an in-mould-coating process to give the component.

12. A method of using a polyamide moulding composition for the production of components according to claim 10, comprising:
using an extrusion process or extrusion blow moulding process, an injection-moulding process or an in-mould-coating process to give the component.

13. The polyamide moulding composition according to claim 1, wherein the polyamide matrix (A) consists of:
(A1) from 80 to 95% by weight, of said polyamide 12 mixture;
(A2) from 5 to 20% by weight, of polyamide elastomer based on polyamide 12, where the entirety of (A1) and (A2) provides 100% by weight of component (A).

14. The polyamide moulding composition according to claim 1,
wherein the polyamide elastomer of component (A2) has hard segments based on polyamide 12, and soft segments based, exclusively, on polyether diol based, exclusively, on at least one unit selected from the group consisting of: ethylene oxide, propylene oxide, tetrahydrofuran and mixtures thereof, and/or
dimer diol, based on dimerized fatty acids having from 20 to 44 C atoms, and/or
polyetherdiamine based, exclusively, on at least one unit selected from the group consisting of: ethylene oxide, propylene oxide, tetrahydrofuran and mixtures thereof.

15. The polyamide moulding composition according to claim 3, wherein the number-average molar mass of the hard polyamide 12 segment is in the range from 500 to 10 000 g/mol.

16. The polyamide moulding composition according to claim 3, wherein the number-average molar mass of the hard polyamide 12 segment is in the range from 750 to 3000 g/mol.

17. The polyamide moulding composition according to claim 3, wherein the number-average molar mass of the soft segments is in the range from 200 to 4000 g/mol.

18. The polyamide moulding composition according to claim 3, wherein the number-average molar mass of the soft segments is in the range from 300 to 2500 g/mol.

19. The polyamide moulding composition according to claim 3, wherein the hard polyamide 12 segment contributes from 45 to 95% by weight, and the soft segments contribute from 5 to 55% by weight, based in each case on 100% of component (A2).

20. The polyamide moulding composition according to claim 3, wherein the hard polyamide 12 segment contributes from 50 to 80% by weight, and the soft segments contribute from 20 to 50% by weight, based in each case on 100% of component (A2).

21. The polyamide moulding composition according to claim 3, wherein component (A2) is free from ester bonds.

22. The polyamide moulding composition according to claim 1,
wherein the content of component (B) within the moulding composition is in the range from 10 to 17% by weight; and/or
that component (B) is composed of 100% by weight of (B1), 0% by weight of (B2), where the entirety of (B1) and (B2) provides 100% by weight of component (B).

23. The polyamide moulding composition according to claim 1, wherein the at least one metal phosphinate of component (B1) is selected from the group consisting of phosphinic salt and diphosphinic salt.

24. The polyamide moulding composition according to claim 1, wherein the at least one metal phosphinate of component (B1) is selected from the group consisting of: phosphonic salt of the general formula (I) and formula (II) andpolymers thereof

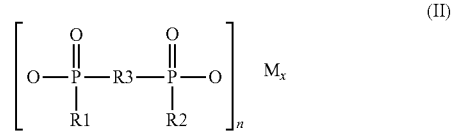

in which
R1, R2 are identical or different and C1-C8-alkyl, linear or branched and/or aryl;
R3 are C1-C10-alkylene, linear or branched, C6-C10-arylene, -alkylarylene or arylalkylene;
M is a metal ion from the 2nd or 3rd main or transition group of the periodic table of the elements; and
m is 2 or 3;
n is 1 or 3;
x is 1 or 2,
where Al, Ca and Zn are used as metal ion M.

25. The polyamide moulding composition according to claim 1, wherein the content of the plasticizer of component (C) in the moulding composition is in the range from 5 to 10% by weight.

26. The polyamide moulding composition according to claim 1, wherein the content of component (D) in the moulding composition is in the range from 8 to 10% by weight.

27. The polyamide moulding composition according to claim 1, wherein the content of component (E) in the moulding composition is in the range from 1 to 5% by weight.

28. The polyamide moulding composition according to claim 1, wherein said composition consists of:
(A) from 60 to 79% by weight of a polyamide matrix consisting:
  (A1) from 80 to 92% by weight of said polyamide 12 mixture;
  (A2) from 8 to 20% by weight of polyamide elastomer made of hard polyamide 12 segments and of soft segments based, exclusively, on polyetherdiol made of at least one unit selected from the group consisting of: ethylene oxide, propylene oxide, and tetrahydrofuran; where the polyamide elastomer is free from ester bonds;
  where the entirety of (A1) and (A2) provides 100% by weight of component (A);
(B) from 8 to 25% by weight of flame retardant consisting of at least one metal phosphinate selected from the group consisting of: phosphinic salt and diphosphinic salt;
(C) from 5 to 10% by weight of said plasticizer;
(D) from 8 to 12% by weight of said polyolefin;
(E) from 0.3 to 5% by weight of said additives;
  where the entirety of (C) and (D) is from 13 to 20% by weight, based on the entire moulding composition, and
  where the entirety of (A) to (E) provides 100% by weight.

29. A process for the production of a polyamide moulding composition according to claim 1, wherein components (A1) and (A2) are mixed and simultaneously or subsequently components (B) to (E) are incorporated, where the mixing takes place in the temperature range from 270 to 290° C. and the plasticizer (C) is introduced into the mixture either separately by way of a liquid metering system or after premixing with component (A) by way of a granulate metering system, and the flame retardant (B) is incorporated by way of separate powder metering system into the remainder of the mixture which already takes the form of a melt.

30. A component made of a polyamide moulding composition, produced in a process according to claim 9, for fire-protected applications in the railway sector, as coating, covering, film, profile, corrugated or non-corrugated pipe, hollow body, gasket, cladding, holder, housing, sheathing, or electrical or electronic component, plugged or fan, approved in accordance with DIN EN 45545.

* * * * *